(No Model.)
W. G. ENTREKIN.
PHOTOGRAPH BURNISHING MACHINE.
No. 355,923. Patented Jan. 11, 1887.
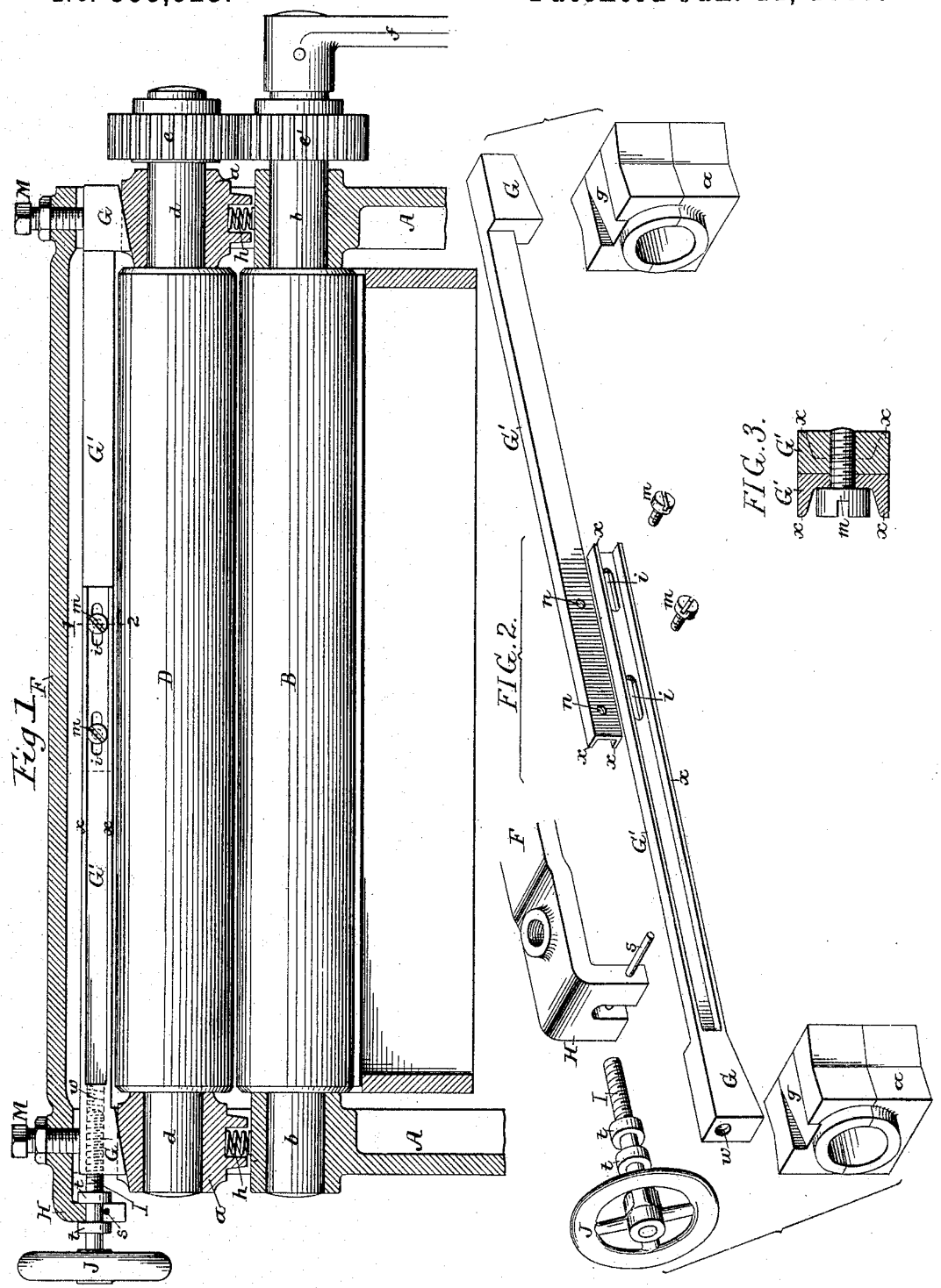
Witnesses:
William D. Conner.
David S. Williams
Inventor:
William G. Entrekin
by his Attorneys
Howson & Sons

UNITED STATES PATENT OFFICE.

WILLIAM G. ENTREKIN, OF PHILADELPHIA, PENNSYLVANIA.

PHOTOGRAPH-BURNISHING MACHINE.

SPECIFICATION forming part of Letters Patent No. 355,923, dated January 11, 1887.

Application filed December 10, 1886. Serial No. 221,168. (No model.)

*To all whom it may concern:*

Be it known that I, WILLIAM G. ENTREKIN, a citizen of the United States, residing in Philadelphia, Pennsylvania, have invented certain Improvements in Photograph-Burnishing Machines, of which the following is a specification.

The object of my invention is to provide simple means for readily and accurately adjusting the movable roll of a photograph-burnishing machine, and this object I attain in the manner which I will now proceed to describe, reference being had to the accompanying drawings, in which—

Figure 1 is a transverse section, partly in elevation, of sufficient of a burnishing-machine to illustrate my improvements, Fig. 2 showing, in perspective, the detached parts to which my invention particularly relates, and Fig. 3 being a transverse section, partly in elevation and on an enlarged scale, on the line 1 2, Fig. 1.

A A represent parts of the opposite fixed end frames of a burnishing-machine, in which are formed bearings for the spindles $b$ of the lower or burnishing roll, B, of the machine and guides for the boxes $a$, carrying the journals $d$ of the movable upper feed-roll, D, these rolls being suitably geared together by means of spur-wheels $e\ e$ at one end, and one of the spindles of the lower roll being provided with an operating-handle, $f$, a portion of which is shown in Fig. 1. A cross-bar, F, forms part of the fixed frame of the machine, and serves to connect the upper ends of the end frames, A.

The boxes $a$ of the upper roll, D, are acted upon by wedges G G, both facing in the same direction, the backs of these wedges bearing against set-screws M, adapted to threaded openings in the fixed frame of the machine, and the bottoms of the wedges having their bearings upon the inclined faces of recesses $g$ in the tops of the boxes $a$, whereby, when the wedges are moved forward, the boxes will be depressed, and when said wedges are retracted the boxes will be raised under the action of springs $h$. Each wedge has an inwardly-projecting arm, G', the inner ends of these arms overlapping each other, and one arm having longitudinal slots $i$ for the reception of the stems of confining-bolts $m$, which are threaded for adaptation to threaded openings $n$ in the other bar.

When the bolts $m$ are tightened, the two bars G' are firmly confined together laterally, and hence form a rigid connection between the opposite wedges, so as to insure the simultaneous operation of said wedges; but upon loosening the bolts $m$ the wedges and their bars can be adjusted longitudinally in respect to each other, and any desired independent setting of the wedges thereby permitted.

When it is not desired to adjust the wedges by slipping the bars G' upon each other, the adjustment may be effected by means of the set-screws M.

Each of the bars G' has ribs $x$, so as to impart to it the desired rigidity and prevent it from buckling under longitudinal strain or pressure.

At one end of the bar F is a downwardly-projecting wing, H, which is slotted for the reception of a stem, I, the vertical confinement of which in the slot is effected by a transverse pin, $s$, while collars $t$ on the stem on opposite sides of the wing H serve to confine the stem longitudinally to said wing.

The stem I has at the outer end an operating-wheel, J, and the inner end of the stem is threaded for adaptation to a threaded opening, $w$, in the adjacent wedge G, so that by turning the stem in one direction or the other the wedges may be simultaneously advanced or retracted to effect the vertical adjustment of the roll D.

I claim as my invention—

1. The combination of the frame and movable roll of a burnishing-machine with wedges acting on the boxes of said movable roll, wedge-connecting bars having overlapping ends, and means for securing said overlapping ends of the bars together in different positions, all substantially as specified.

2. The combination of the fixed frame of the machine, the movable roll and its boxes, wedges acting on the latter and having inwardly-projecting ribbed bars with overlapping ends, and means for securing said overlapping ends together, all substantially as specified.

3. The combination of the fixed frame, the movable roll and its boxes, the opposite wedges, both facing in the same direction, a rigid connection between the two wedges, and a screw-stem longitudinally confined to the fixed frame and adapted to a threaded opening in one of said wedges, all substantially as specified.

4. The combination of the fixed frame of the machine, the movable roll and its boxes, the wedges acting on said boxes and both facing in the same direction, a rigid transverse bar connecting said wedges and adjustable as to its length, and means for imparting longitudinal movement to one of the boxes, which movement is transmitted through the rigid connection to the other box, all substantially as specified.

5. The combination of the frame and movable roll of the machine, the wedges acting upon the boxes of said roll and both facing in the same direction, a rigid connection between the wedges, an adjusting device effecting a simultaneous adjustment of both wedges, and a set-screw acting upon each wedge to adjust it independently of the other, all substantially as specified.

In testimony whereof I have signed my name to this specification in the presence of two subscribing witnesses.

W. G. ENTREKIN.

Witnesses:
WILLIAM D. CONNER,
HARRY SMITH.